United States Patent
Matsuyama et al.

[19]

[11] Patent Number: 5,883,387
[45] Date of Patent: Mar. 16, 1999

[54] SPM CANTILEVER AND A METHOD FOR MANUFACTURING THE SAME

[75] Inventors: Katsuhiro Matsuyama, Hachioji; Michio Takayama, Nagano-ken, both of Japan

[73] Assignee: Olympus Optical Co., Ltd., Tokyo, Japan

[21] Appl. No.: 878,686

[22] Filed: Jun. 19, 1997

Related U.S. Application Data

[63] Continuation of Ser. No. 556,715, Nov. 13, 1995, abandoned.

[30] Foreign Application Priority Data

Nov. 15, 1994 [JP] Japan .................................. 6-304229

[51] Int. Cl.⁶ .................................................. G01B 5/28
[52] U.S. Cl. ................... 250/306; 250/227.26; 250/234; 73/105
[58] Field of Search .................................. 250/306, 234, 250/227.26; 73/105

[56] References Cited

U.S. PATENT DOCUMENTS

| | | | |
|---|---|---|---|
| 4,724,318 | 2/1988 | Binnig | 250/306 |
| 5,214,282 | 5/1993 | Yamaguchi et al. | 250/306 |
| 5,272,330 | 12/1993 | Betzig et al. | 250/216 |
| 5,354,985 | 10/1994 | Quate | 250/306 |
| 5,357,787 | 10/1994 | Kado et al. | 73/105 |
| 5,410,151 | 4/1995 | Buckland | 250/306 |
| 5,489,774 | 2/1996 | Akamine et al. | 250/234 |

FOREIGN PATENT DOCUMENTS 62-130302  6/1987  Japan .
4-291310  10/1992  Japan .

OTHER PUBLICATIONS

T.R. Albrecht et al; "Atomic Resolution Imaging of a Nonconductor By Atomic Force Microscopy"; Oct. 1, 1987; pp. 2599–2602; J. Appl. Phys., vol. 62; No. 7.

Applied Physics Letters, vol. 62, Feb. 1, 1993, No. 5 N.F. van Hulst et al, Near–Field Optical Microscope Using a Silicon–Nitride Probe.

Journal of Vacuum Science & Technology B, Second Series, vol. 9, No. 2, Part II, Mar./Apr., 1991, O. Wolter, et al, Micromachined Silicon Sensors for Scanning Force Microscopy.

*Primary Examiner*—Jack I. Berman
*Attorney, Agent, or Firm*—Frishauf, Holtz, Goodman, Langer & Chick

[57] ABSTRACT

An SPM cantilever comprises a cantilever portion shaped as a thin plate and extending between a proximal end and a free end, a supporting portion attached to one surface of the cantilever portion on a side of the proximal end, and a probe projecting from the other surface of the cantilever portion on a side of the free end of the cantilever portion the supporting member, and the cantilever portion and the probe are made of different materials.

12 Claims, 10 Drawing Sheets

SPM CANTILEVER AND A METHOD FOR MANUFACTURING THE SAME

This application is a Continuation of application Ser. No. 08/556,715, filed Nov. 13, 1995, now abandoned.

BACKGROUND OF THE INVENTION

1. Field of the Invention

The present invention relates to an SPM cantilever for use in a scanning probe microscope such as an atomic force microscope, and a method for manufacturing the SPM cantilever.

2. Description of the Related Art

Since a scanning tunneling microscope (STM) was invented by Binning, Rohrer, et al., as an apparatus for observing a conductive sample in a resolution on the order of the atomic size, it has been utilized in various fields as a microscope with which surface ruggedness can be observed in the atomic order. However, the sample, which can be observed by the STM, is limited to a conductive substance.

An atomic force microscope (AFM) has been proposed as a microscope to observe an insulating sample, which cannot be easily inspected by the STM, utilizing the element techniques, such as the servo technique in the STM. The AFM is disclosed in, for example, Jpn. Pat. Appln. KOKAI Publication No. 62-130302.

The AFM is similar to the STM in structure, and classified as one of scanning probe microscopes (SPMs). In the AFM, a cantilever having a sharp projection (probe) at the free end is arranged near a measurement surface of a sample so as to be faced thereto. A movement of the cantilever, due to interaction between an atom at the end of the probe and an atom of the sample, is measured electrically or optically, while the sample or the probe is scanned in XY directions to relatively change the positional relationship between the cantilever and the probe. In this manner, information on the sample, such as the ruggedness, can be inspected three-dimensionally on the order of the atomic size.

A cantilever chip for use in the SPM, such as the AFM as described above, has been able to be produced in a high reproducibility with a high accuracy in the micron order, since T. R. Albrecht et al. proposed a cantilever made of silicon oxide film, which can be manufactured by the semiconductor IC manufacturing process (Thomas R. Albrecht and Calvin F. Quate: Atomic Resolution Imaging of a Nonconductor Atomforce Microscopy, J. Appl. Phy. 62 (1987) 2599). Because such cantilever chips can be produced by a batch process, the production cost is considerably reduced. Accordingly, at present, the cantilevers produced by utilizing the semiconductor IC manufacturing process have become mainstream of the SPM cantilevers.

A conventional method for producing an AFM cantilever made of silicon nitride film, utilizing the semiconductor IC manufacturing process, will be described with reference to FIGS. 12A to 12F (first prior art). First, as shown in FIG. 12A, a silicon nitride film pattern 902 is formed on the main surface (the (100) plane) of an Si substrate 901, thereby forming a starting substrate 900. Thereafter, as shown in FIG. 12B, the Si substrate 901 is subjected to anisotropic wet etching with KOH or the like, using the silicon nitride film pattern 902 as an etching-resistant mask. As a result, a pyramidal replica hole 903, serving as a mold of a probe of a cantilever, is formed on part of the main surface of the Si substrate 901. Then, as shown in FIG. 12C, the silicon nitride film pattern 902 is removed, and a new silicon nitride film 904, serving as a material of a cantilever, is deposited on the main surface of the Si substrate 901 including the exposed surface of the replica hole 903. Further, as shown in FIG. 12D, the silicon nitride film 904 is selectively etched into the shape of the cantilever, thereby forming a cantilever pattern 905. Then, as shown in FIG. 12E, Pyrex 906 to be a supporting member of the cantilever is anode-bonded to a predetermined region of the cantilever pattern 905. Subsequently, as shown in FIG. 12F, the Si substrate 901 is entirely removed by etching, thereby forming an AFM cantilever 907 having a supporting portion 906, a lever portion 905a and a probe portion 905b.

Thus, the AFM cantilever manufactured in the above method comprises a supporting portion made of glass, and probe and cantilever portions formed of silicon nitride film so as to be integral with each other. The AFM cantilevers having such a structure can be produced in a high reproducibility with a high accuracy of the micro n order. In addition, since the probe is made of silicon nitride film, which has a hydrophilic nature, it is applicable to AFM measurement in a liquid suitable to a living organism sample.

Recently, measurement with a scanning near-field optical microscope (SNOM) has attracted public attention. The SNOM has a resolution beyond the diffraction limit by virtue of an evanescent wave. Like the STM and the AFM, the SNOM is a kind of SPM, and uses a method for obtaining an optical image of a very high resolution by scanning an optically transmissible prove near a sample irradiated with light, utilizing the characteristic that the evanescent wave is located in a limited region smaller than the wavelength and is not transmitted in free space.

The measuring principle of the SNOM is to first cause the probe to approach near the surface of a measurement sample to a distance of about 1 wavelength or shorter, and prepare a map of intensity of light transmitted through a fine opening at the end of the probe, thereby resolving an image of the measurement sample. There ar e a number of measuring methods using the SNOM, which are divided broadly into two. One is called the collection method, in which an evanescent wave, transmitted through the sample when the sample is irradiated with light and located in a limited region near the surface of the sample, is detected through the probe to form an SNOM image. The other is called the emission method, in which the sample is irradiated with light emitted from the probe having a minute opening and light transmitted through the sample is detected by an optical detector arranged under the sample. This method is disclosed in, for example, Jpn. Pat. Appln. KOKAI Publication No. 4-291310.

It is reported that the aforementioned AFM cantilever having a probe made of silicon nitride film can be applied to the SNOM measurement (N. F. van Hulst, M. H. P. Moers, O. F. J. Moordman, R. G. Tack, F. B. Segerink, B. Bolger; Near-field Optical Microscope Using a Silicon-nitride Probe, Appl. Phys. lett. 62,461 (1993)). Since silicon nitride film is capable of transmitting light, the AFM cantilever having a probe made of silicon nitride film is applicable to the SNOM measurement.

AFM measuring methods have a contact mode and a non-contact mode. The contact mode includes a method of measuring the surface of a sample in a state where the sample and the probe are in contact with each other and a tapping mode of measuring the surface of a sample, while tapping the sample surface. The non-contact mode includes a method of measuring the surface of a sample in a state where the sample and the probe are separated from each other at a distance of 5 to 10 nm and an oscillation mode (AC mode) in which the sample or the probe is oscillated at a constant frequency in a non-contact state. Of these methods, the AC mode and the tapping mode require a hard cantilever.

To produce a hard cantilever, a lever film must be thick. As an example of the hard cantilever, a type of AFM cantilever is widely known, in which the probe, the lever, and the supporting portion are integrally formed of silicon (e.g., O. Wolter, Th. Bayer, and J. Greschner; Micromachined Silicon Sensors for Scanning Force Microscopy, J. Vac. Sci. Technol. B9(2), May/April 1991) (second prior art).

The cantilever integrally formed of silicon is produced by the semiconductor manufacturing technique like the aforementioned AFM cantilever. Therefore, it can be produced in a high reproducibility with a high accuracy on the micron order. In addition, since a lever is constituted by a silicon substrate, a thick lever can be produced easily. Since the probe is made of silicon, the conductivity can be added to the probe by diffusing an impurity into silicon in advance. It is therefore possible to perform STM measurement and surface decoration or process by using the probe.

The SPM cantilever for use in, for example, an AFM, in which a probe and a lever are integrally formed of silicon (first prior art), has the following drawbacks. The thickness of the cantilever is determined by the thickness of silicon nitride film deposited after forming a replica hole. However, to avoid a crack or a bend of the substrate due to the stress in deposition of silicon nitride film, the thickness of the film which can be deposited is limited to about 1 $\mu$m. It is therefore impossible to form a hard cantilever useful for measurement of the AC-mode or tapping mode. Further, since the probe is made of silicon nitride film, i.e., insulating film, it is difficult to apply the probe to the STM measurement and surface decoration or process.

Furthermore, in the cantilever made of silicon nitride film, to avoid a bend of the lever after removing the substrate by etching, the ratio of Si to N contained in silicon nitride film must be higher than 3:4 of the normal semiconductor IC. The inventors found that the optical transmittance is lowered in the silicon nitride film containing Si in a higher ratio, since light is absorbed by Si in a region of a short wavelength shorter than 400 nm.

As described before, the SPM cantilever formed integrally with silicon nitride is applicable to the SNOM measurement. To analyze by the SNOM a spectrum of fluorescence emitted from the measurement sample, the optical transmittance of the probe in a wide wavelength region is required. However, since the probe and the lever are formed integral with each other, the probe is made of the silicon nitride film containing Si in a high ratio, which lowers the optical transmittance in a short wavelength region. The probe is therefore unsuitable for such a measurement.

In the conventional SPM integrally formed as mentioned above, since both the probe and the lever are formed of silicon nitride, part of evanescent light input through the end of the probe or light scattered in the probe is transmitted from the probe to the lever. Therefore, the amount of light, which can be applied to the SNOM measuring optical detector (e.g., the photodetector) arranged above the cantilever, is as small as 100 pW. For this reason, the loss of the light detected by the optical detector is great relative to the light incident on the end of the probe, resulting in the problem that the SNOM measurement cannot be performed with a high sensitivity.

In the AFM cantilever in which the probe, the lever and the supporting member are integrally formed of Si (second prior art), since the probe is made of Si, in order to perform AFM measurement in water, which is available for living organism, it is necessary to coat the probe surface with hydrophilic film, thereby changing hydrophobic Si to hydrophilic. In this case, the sharpness of the end of the probe is reduced. Moreover, since the supporting member is formed of Si so as to be integral with the lever, it is necessary to form patterns on both surfaces of the substrate, and a special manufacturing apparatus is required.

Further, whether the cantilever has a probe made of silicon nitride or silicon, the mechanical strength thereof is not sufficient for the ultra-refined machining technique. As described above, in the AFM cantilever produced by the conventional semiconductor manufacturing technique, it is difficult to simultaneously satisfy the requirement for the probe and the requirement for the lever, since the probe and the lever are formed of the same material.

SUMMARY OF THE INVENTION

An object of the present invention is to provide an SPM cantilever and a method for manufacturing the same which satisfy the requirement for the lever characteristic and the probe characteristic in accordance with the usage and the way of use.

An object of the invention is to produce the SPM cantilever only by a process from one surface of the substrate without a special apparatus.

An object of the invention is to provide an SPM cantilever suitable for spectrum measurement with the SNOM by a probe having a high optical transmittance even in a short wavelength region.

An object of the invention is to provide an SPM cantilever applicable to STM measurement and surface decoration or process.

An object of the invention is to provide an SPM cantilever applicable to AFM measurement, STM measurement and SNOM measurement.

An object of the invention is to provide an SPM cantilever applicable to an ultra-refined mechanical processing technique.

An object of the invention to is to provide an SPM cantilever, in which evanescent light or scattered light scattered at the end of the probe is not dispersed in the cantilever portion, so that it can be fully applied to the optical detector arranged above the probe.

An object of the invention is to provide a method for producing the SPM cantilever easily and efficiently.

In order to solve the problems of the conventional art as described above, the SPM cantilever of the invention comprises a supporting portion, a cantilever portion arranged so as to be extended from the supporting portion, and a probe portion provided at a free end of the cantilever on a surface of the cantilever on the side opposite to the supporting portion, the supporting portion, the cantilever portion and the probe portion being made of different materials.

With the SPM cantilever having the above structure, since the probe portion and the cantilever portion are made of different materials, the requirement for the probe and the requirement for the lever can be satisfied easily in accordance with the usage and the way of use. For example, if Si is used as the material of the cantilever portion, a hard lever characteristic can be obtained, whereas if silicon nitride film is used, a soft lever characteristic can be obtained. In addition, it is possible to form a probe portion having any characteristic, e.g., optical transmittance, hydrophilicity, conductivity, and rigidness, in accordance with the usage.

In the SPM cantilever, the probe portion is made of a material which transmits visible light and an optical shading portion is interposed between the probe portion and the cantilever portion. The optical shading portion is formed of a member having a refraction index smaller than that of the probe portion, for example, metal or silicon oxide film and for example, metal material is used as optically reflective material.

With the optical shading portion formed of a small refraction index material, e.g., metal or silicon oxide, evanescent light incident on the end of the probe portion or scattered light scattered at the end of the probe portion is prevented from being transmitted to the cantilever portion. The light therefore can be applied to the optical detector arranged above the probe portion with little loss and the S/N ratio in the SNOM measurement can be improved.

According to the method of the present invention, the SPM cantilever can be produced easily with only the process from the substrate surface without a special manufacturing apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1A:
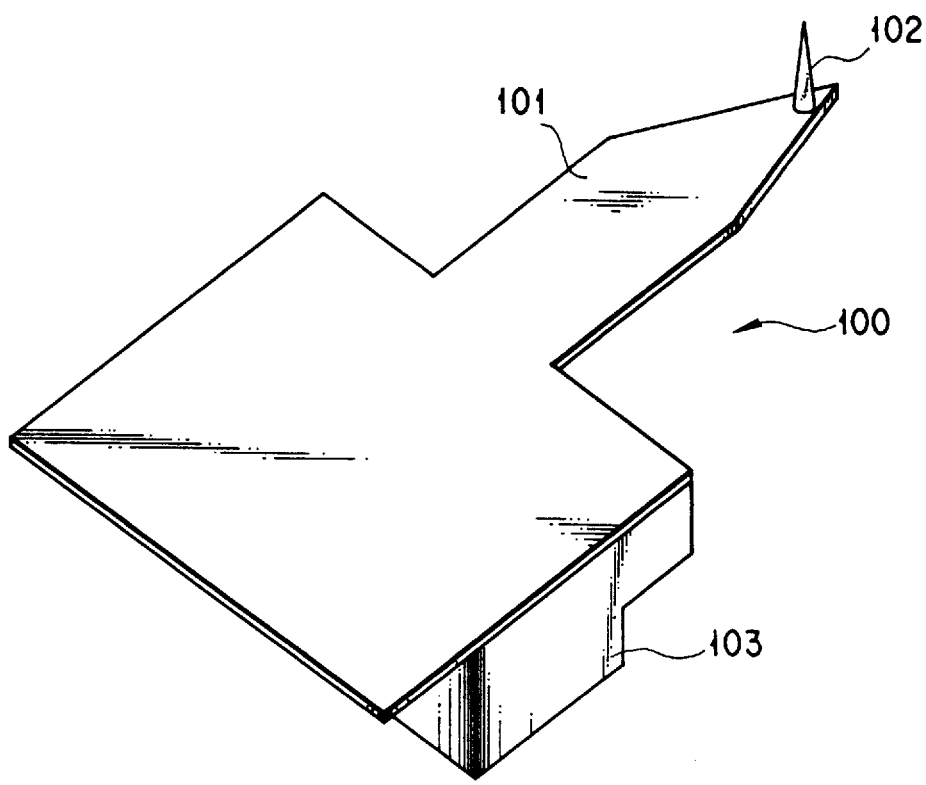
FIGS. 1A and 1B are respectively a perspective view and a cross-sectional view showing a first embodiment of an SPM cantilever according to the present invention.
Figure 1B:
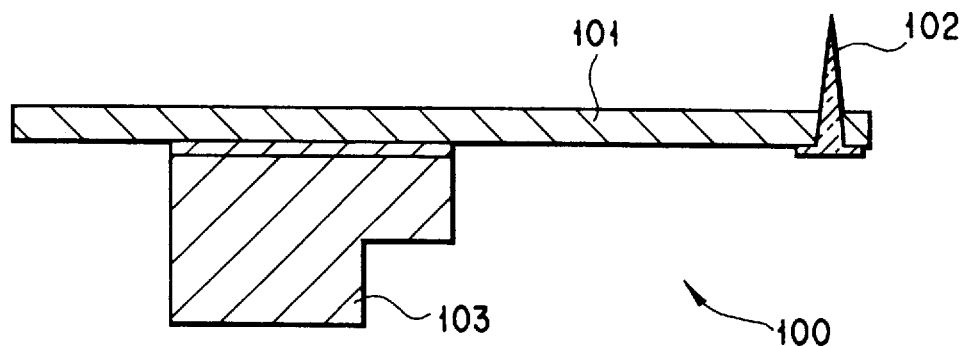

Embodiments of the present invention will now be described with reference to the drawings. FIGS. 1A and 1B show an SPM cantilever according to a first embodiment of the present invention: FIG. 1A is a perspective view and FIG. 1B is a cross-sectional view. An SPM cantilever 100 of this embodiment comprises a cantilever portion or a thin plate-like portion 101, a probe portion 102 provided at a distal end of the cantilever portion 101 and a supporting portion or a thick block portion 103 provided on a proximal end portion of the cantilever portion 101. Silicon or silicon nitride is suitable for the material of the cantilever portion 101. The probe portion 102 may be formed of a desired one selected from various materials having characteristics of light-transmittance, conductivity and rigidness. The supporting portion 103 may be formed of glass, Si or the like.

There will now be described first to fourth embodying methods for manufacturing an SPM cantilever shown in FIGS. 1A and 1B, with reference to FIGS. 2A to 5F.

Figure 2A:
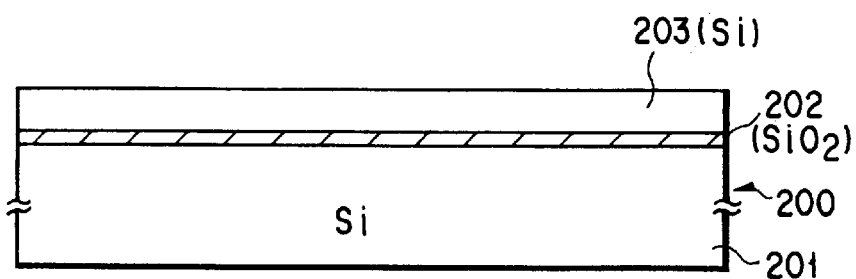
FIGS. 2A to 2F are diagrams for explaining a first embodiment of a method for manufacturing the SPM cantilever as shown in FIGS. 1A and 1B according to the present invention

A method according to the first embodiment for manufacturing the SPM cantilever of the above structure, having the cantilever portion made of Si, will be described with reference to FIGS. 2A to 2F, which show manufacturing steps. First, as shown in FIG. 2A, a silicon oxide film 202 is formed on an upper surface or a main surface (the (100) plane) of a first monocrystalline silicon wafer 201. Then a second monocrystalline silicon wafer 203, whose main or lower surface is the (100) plane, is adhered to the silicon oxide film 202, thus forming a so-called laminated SOI (Silicon on Insulator) substrate used as a starting substrate 200. The second silicon wafer 203 is to form a cantilever and the thickness thereof is set in accordance with a required characteristic of the lever. For example, the thickness of the wafer 203 is about 2 μm.

Figure 2B:
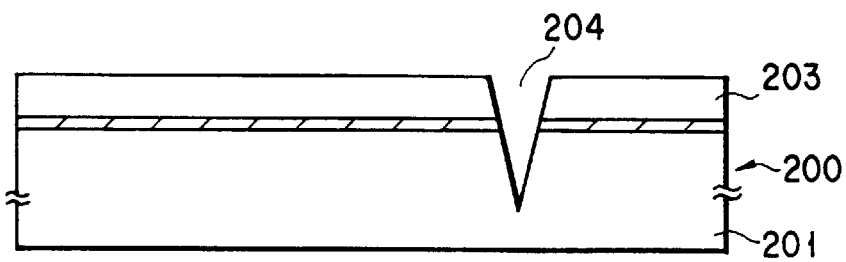
Figure 2C:
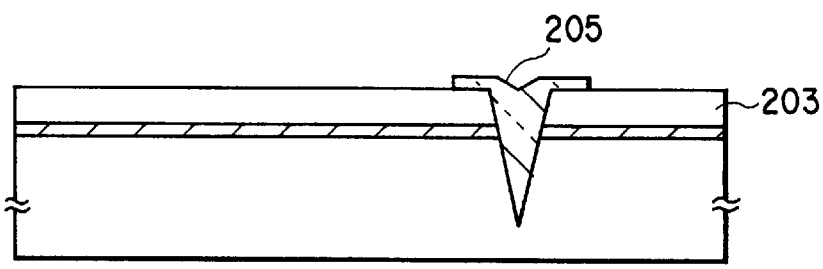
Figure 2D:
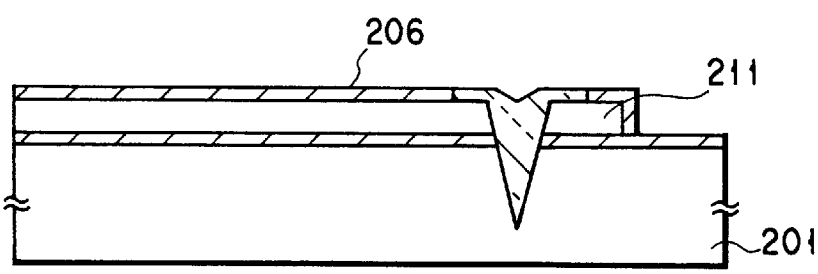

Then, as shown in FIG. 2B, a replica hole 204 is formed by etching the starting substrate 200 by, for example, an RIE (Reactive Ion Etching) method which is one of dry etching methods, or a wet etching method, in an upper portion of the starting substrate 200, i.e., a portion of the second silicon wafer 203, where a probe is to be formed, so as to penetrate the first silicon wafer 201. Subsequently, a probe forming material 205 is deposited on the upper surface of the substrate 205 by the vacuum CVD method, plasma CVD method, sputtering method, sol-gel method, or the like. After a mask pattern is formed at the replica hole portion, the probe forming material 205, except for the portion including the replica hole, is removed by etching. As a result, as shown in FIG. 2C, the upper portion of the substrate 200, except for the portion on and around the replica hole, is exposed. Then, a mask pattern for forming a cantilever is formed on the second silicon wafer 203, and then the silicon wafer 203 is etched by the RIE method or the like so as to form a cantilever pattern 211 shaped like the cantilever portion 101 shown in FIG. 1A. Thereafter, as shown in FIG. 2D, a silicon oxide film 206 is formed on the cantilever pattern 211 made of the silicon wafer 203.

Figure 2E:
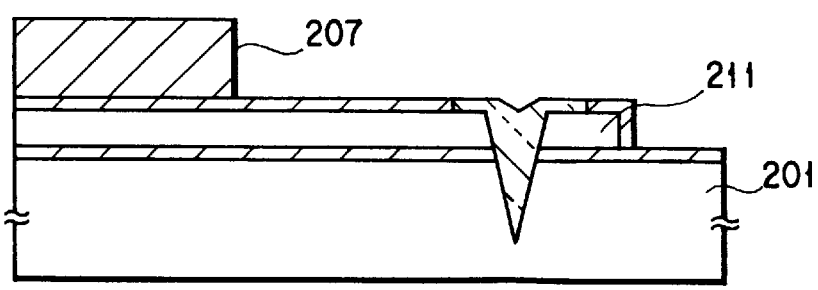
Figure 2F:
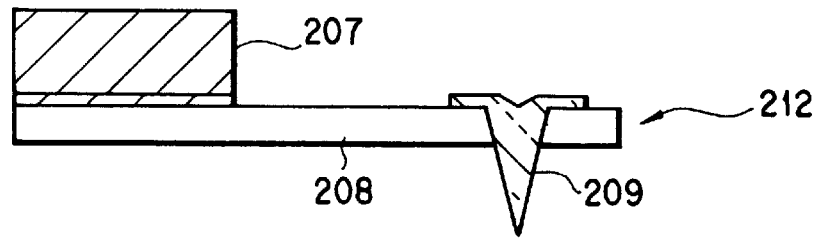

Further, as shown in FIG. 2E, a supporting portion 207 is bonded to an end portion of the cantilever pattern 211 of the starting substrate 200 via the silicon oxide film 206. The bonding of the supporting portion 207 can be achieved by, for example, anode-bonding of Pylex (e.g., #7740) having a groove on one surface or adhesion of a suitable supporting member by adhesive. Then, as shown in FIG. 2F, the first silicon wafer 201 is etched by an aqueous solution of an alkali, such as tetramethylammonium hydroxide (TMAH). Finally, the exposed silicon oxide films 202 and 206 are removed by an aqueous solution of hydrofluoric acid, thereby obtaining an SPM cantilever 212 comprised of the supporting portion 207 made of, for example, glass, a silicon cantilever portion 208 and a probe portion 209. In this embodiment, an aqueous solution of tetramethylammonium hydroxide (TMAH) is used as an etching solution in the step shown in FIG. 2F. However, an aqueous solution of potassium hydroxide (KOH) or ethylenediamine pyrocatechol (EDP) can be used instead. Even in this case, the process in the step shown in FIG. 2F is not adversely influenced at all.

In this embodiment, before depositing the probe forming material 205 on the surface of the substrate, the interior of the replica hole 204 may be oxidized at a temperature lower than the glass transition temperature of silicon oxide, for example, at 950° C., thereby forming a sharpening oxide film. In this case, the bottom of the replica hole 204 can be further sharpened, so that the end of the probe portion can be much sharpened.

In the SPM cantilever thus formed, the laminated SOI substrate is used as the starting substrate 200. Therefore, when the first silicon wafer 201 is removed by etching, it is ensured that the etching is stopped at the intermediate silicon oxide film 202. For this reason, the cantilever pattern 211 cannot be damaged and the thickness thereof can be reliably controlled. In addition, since the supporting portion 207 is bonded to the main surface of the substrate 200, it can be easily positioned on the cantilever pattern 211.

If a light transmitting material, such as silicon nitride film, silicon oxide film, ITO, or $SnO_2$, is used as the probe forming material 205, it is possible to perform SNOM measurement or spectrum measurement. In this case, it is preferable to use silicon nitride film containing Si and N in the ratio of 3:4, rather than a low stress silicon nitride film used in the conventional AFM cantilever. This is because a low stress silicon nitride film contains Si in a greater ratio and accordingly the optical transmittance is lowered due to absorption of light by Si in a wavelength of 400 nm or shorter.

As regards the SPM cantilever for performing measurement in which the probe is brought into contact with the sample (contact mode or tapping mode), it is required that the probe portion should not be easily worn or damaged by the contact. In other words, the shape stability of the probe portion is regarded as important. In this respect, it is preferable to use silicon nitride film containing Si and N in the ratio of 3:4 as the probe forming material 205, rather than a low stress silicon nitride film used in the conventional AFM cantilever.

If a conductive material is used as the probe forming material 205, the present invention can be applied to not only the AFM measurement but also the STM measurement and surface decoration or treatment, such as atomic or molecular operation using the STEM. Various metals can be used as the conductive material. Particularly, if a high-melting point metal, such as Mo or W, or a silicide thereof, the substrate can be subjected to a high-temperature heat treatment even after the probe forming material film is formed. In this case, restrictions in the manufacturing process can be reduced. Further, if a transparent electrode material, such as ITO or $SnO_2$, is used as the probe forming material 205, all the AFM, SNOM and STM measurements can be performed. Furthermore, if a rigid material, such as SiC or diamond, is used as the probe forming material 205, the present invention can be applied to an ultra-refined machining technique, for example, scanning and cutting the surface of an object to be machined.

As described above, various materials can be used as the probe forming material in accordance with the usage, for the following reason. In the SPM cantilever of the present invention, the probe portion and the cantilever are made of different materials. It is therefore almost unnecessary to consider restrictions in material (e.g., control of the film stress to prevent a bend of the cantilever) which are imposed on the conventional AFM cantilever wherein the probe and the cantilever are integral with each other.

Figure 3A:
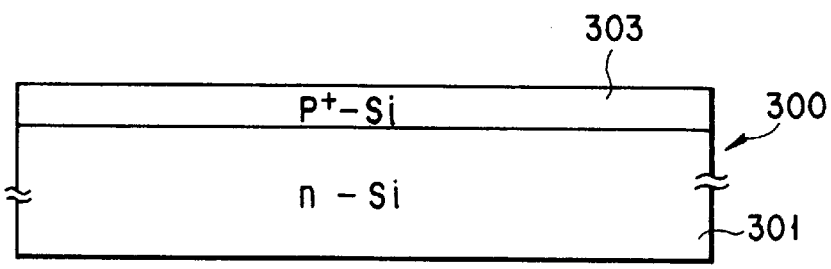
FIGS. 3A to 3F are diagrams for explaining a method for manufacturing an SPM cantilever, according to a second embodiment of the present invention.
Figure 3B:
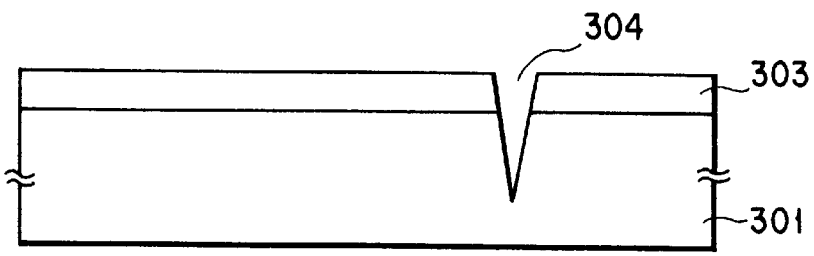

A method for manufacturing an SPM cantilever, according to a second embodiment of the present invention will be described with reference to FIGS. 3A to 3F showing manufacturing steps. In FIGS. 3A to 3F, the members identified by reference numerals 300 to 312 are respectively the same as or similar to those identified by the numerals 200 to 212 in FIGS. 2A to 2F illustrating the method of the second embodiment. In the second embodiment also, Si is used as the material of the cantilever. First, as shown in FIG. 3A, a p-type impurity diffusion layer 303 of a high concentration, to be a cantilever forming portion, is formed on an upper surface of an n-type silicon wafer 301 having a (100) plane. For example, a boron diffusion layer of a surface impurity concentration of $1 \times 10^{19}$ to $1.5 \times 10^{20}/cm^3$ is used as the p-type impurity diffusion layer 303. Then, as shown in FIG. 3B, a probe-forming replica hole 304 is formed in an upper portion of the substrate 300 so as to reach the silicon wafer 301. The replica hole of this embodiment can be formed not only by the dry etching method or wet etching method, as in the first embodiment.

Figure 3C:
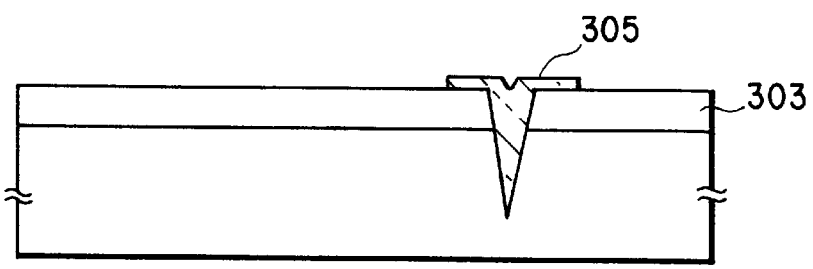
Figure 3D:
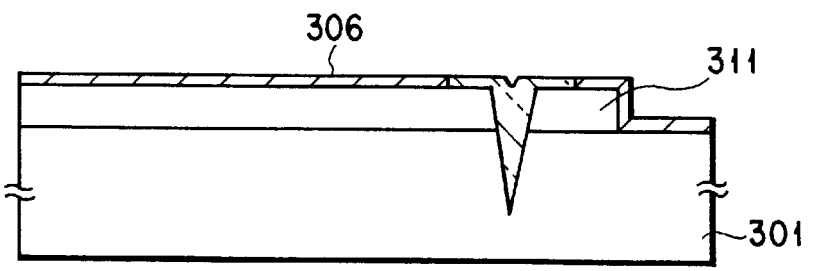
Figure 3E:
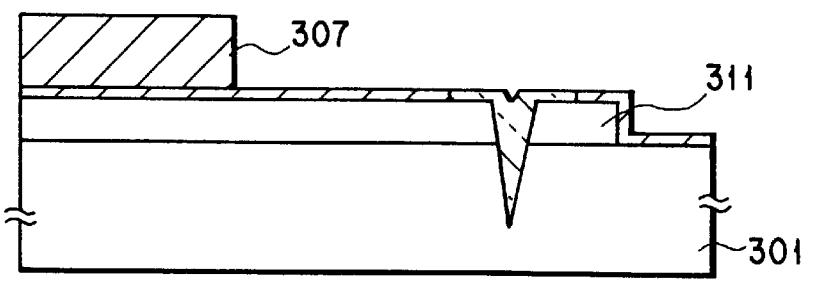

In the same manner as in the first method-embodiment, as shown in FIGS. 3C to 3E, a probe forming material 305 is deposited and then etched, a cantilever pattern 311 and a silicon oxide film 306 are sequentially formed, and a glass substrate to be a supporting portion 307 is adhered to the cantilever pattern 311.

Figure 3F:
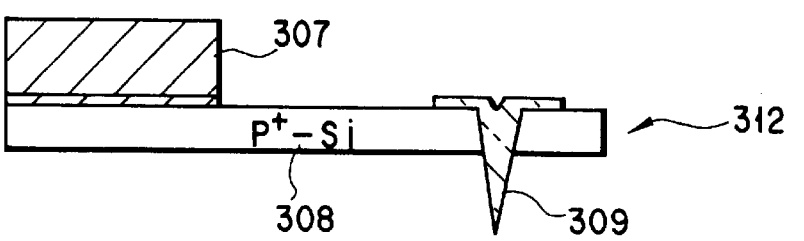

Thereafter, the silicon wafer 301 is entirely removed by etching with an aqueous solution of ethylenediamine pyrocatechol (EDP). Since the etching rate in the high-concentration p-type impurity diffusion layer is considerably reduced in this etching solution, the silicon wafer 301 is gradually etched, and when the cantilever pattern 311 made of the p-type impurity diffusion layer 303 is exposed, the etching is automatically stopped. Finally, the exposed silicon oxide film 306 is removed by an aqueous solution of hydrofluoric acid, thereby obtaining an SPM cantilever 312 comprised of the supporting portion 307 made of glass, a silicon cantilever portion 308 and a probe portion 309, as shown in FIG. 3F.

According to this embodiment, since the starting substrate need not be a special one, the AFM cantilever can be manufactured at a lower cost as compared to the first method-embodiment.

Figure 4A:
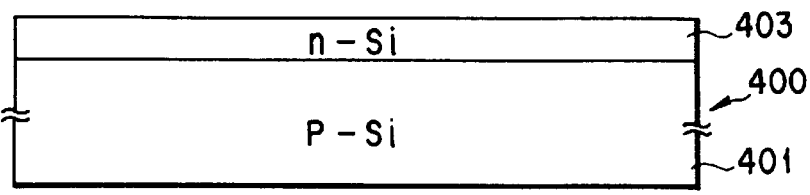
FIGS. 4A to 4F are diagrams for explaining a method for manufacturing an SPM cantilever, according to a third embodiment of the present invention.
Figure 4B:
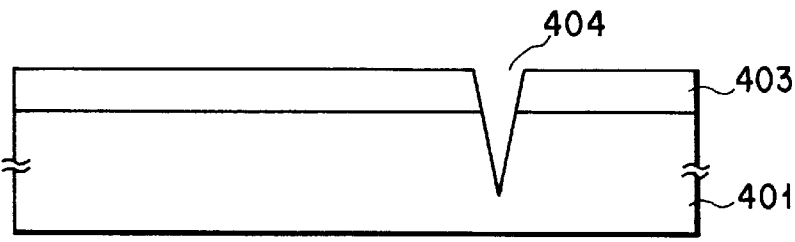

A method for manufacturing an SPM cantilever according to a third method-embodiment of the present invention, in which Si is used as the material of the cantilever, will be described with reference to FIGS. 4A to 4F. In FIGS. 4A to 4F, the members identified by reference numerals 400 to 412 are respectively the same as or similar to those identified by the numerals 200 to 212 in FIGS. 2A to 2F. In this embodiment, as shown in FIG. 4A, a starting substrate 400 is constituted by a p-type silicon substrate 401 of a (100) plane and an n-type silicon layer 403 of a (100) plane laminated thereon. The starting substrate 400 can be formed by either forming an n-type impurity doped layer 403 or an n-type epitaxial layer 403, to be a cantilever portion, on a p-type silicon substrate 401. Then, as shown in FIG. 4B, a probe-forming replica hole 404 is formed in an upper portion of the substrate 400 so as to penetrate the silicon wafer 401. The replica hole of this embodiment can be formed by either the dry etching method or the wet etching method, as in the first method-embodiment.

Figure 4C:
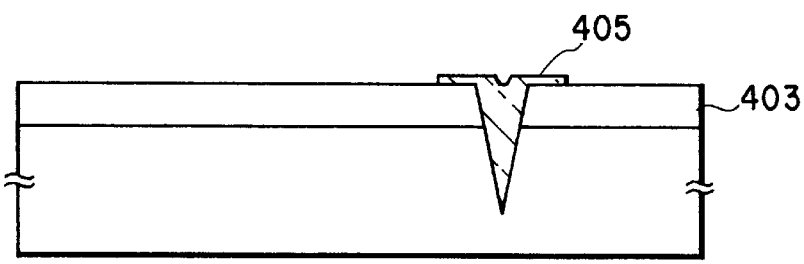
Figure 4D:
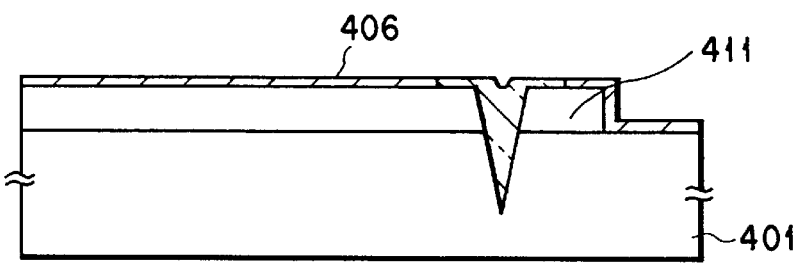
Figure 4E:
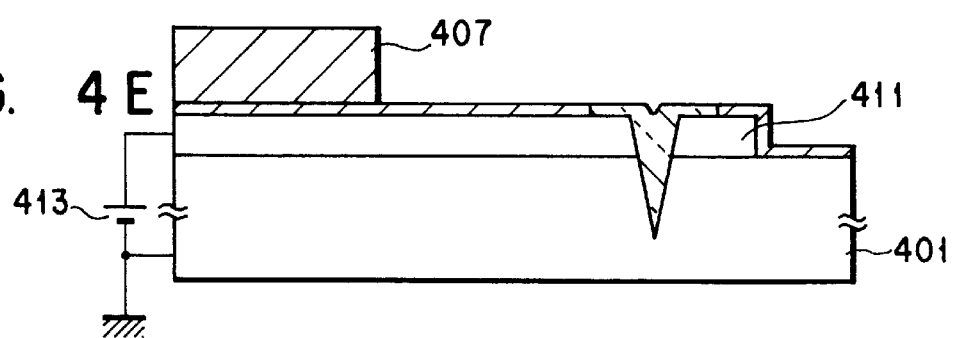

In the same manner as in the first method-embodiment, as shown in FIGS. 4C to 4E, a probe forming material 405 is deposited and then etched, a cantilever pattern 411 and a silicon oxide film 406 are sequentially formed, and a glass substrate to be a supporting portion 407 is adhered to the cantilever pattern 411.

Figure 4F:
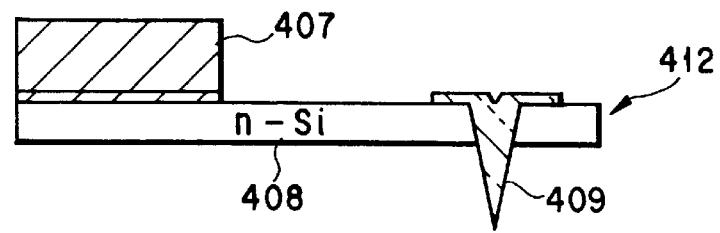

Thereafter, the lower surface portion of the starting substrate 400 is removed by etching. In this time, a potential difference is applied across the p-type silicon substrate 401 and the n-type impurity doped layer or n-type epitaxial layer 403 by a power source 413, while the p-type silicon substrate 401 is removed by etching with an aqueous solution of an alkali (KOH). With this method, the p-type silicon substrate 401 is gradually etched, and when the n-type impurity diffusion layer or n-type epitaxial layer 403 is exposed, the etching is automatically stopped, since a silicon oxide film is formed on the interface between the substrate 401 and the layer 403. Finally, a silicon oxide film 406 is removed by an aqueous solution of hydrofluoric acid, thereby obtaining an SPM cantilever 412 comprised of the supporting portion 407 made of glass, a silicon cantilever portion 408 and a probe portion 409, as shown in FIG. 4F.

Figure 5A:
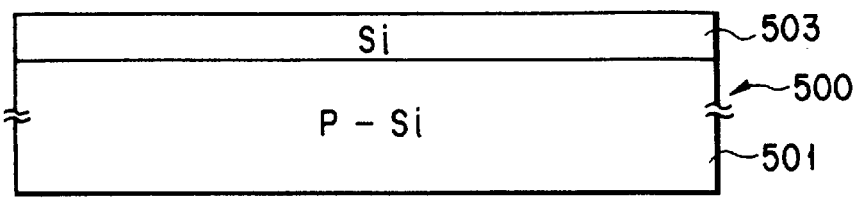
FIGS. 5A to 5F are diagrams for explaining a method for manufacturing an SPM cantilever, according to a fourth embodiment of the present invention.
Figure 5B:
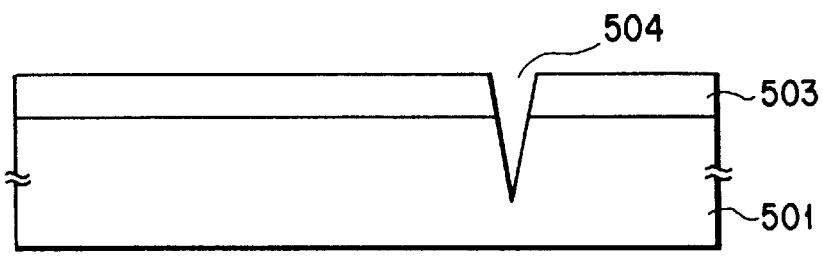
Figure 5C:
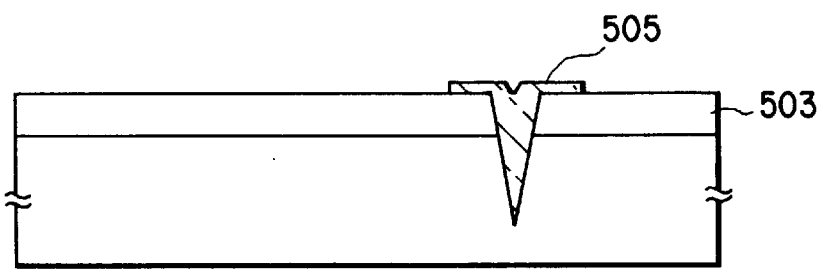
Figure 5D:
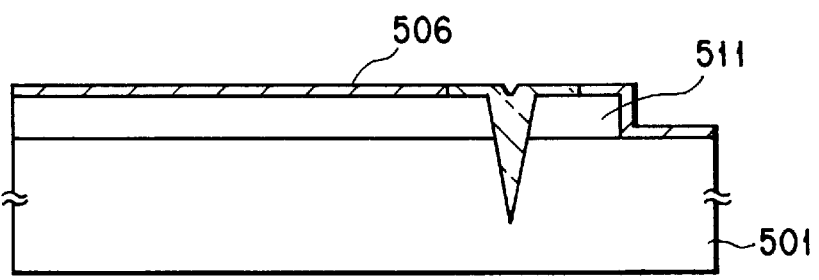
Figure 5E:
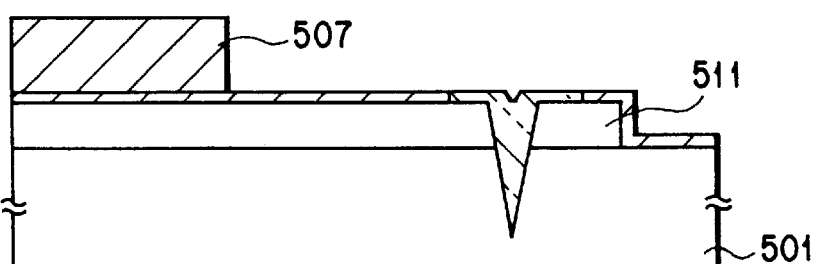
Figure 5F:
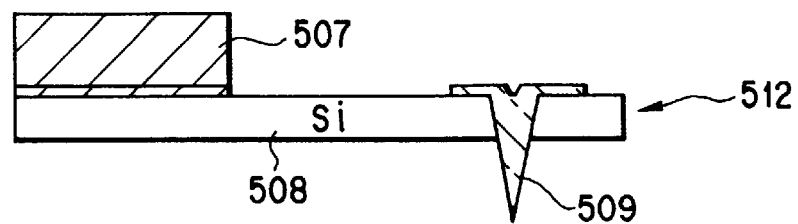

A method for manufacturing an SPM cantilever, according to a fourth embodiment of the present invention, in which Si is used as the material of the cantilever, will be described with reference to FIGS. 5A to 5F. In FIGS. 5A to 5F, the members identified by reference numerals 500 to 512 are respectively the same as or similar to those identified by the numerals 200 to 212 in FIGS. 2A to 2F. In this fourth method-embodiment, as shown in FIG. 5A, a starting substrate 500 is constituted by a first silicon substrate 501 of a (100) plane and a second silicon substrate 503 of a (111) plane, a cantilever forming material, adhered thereto. Then, as shown in FIG. 5B, a probe-forming replica hole 504 is formed in an upper portion of the substrate 500 so as to penetrate the silicon wafer 501.

In the same manner as in the first embodiment, as shown in FIGS. 5C to 5F, a probe forming material 505 is deposited and then etched, a cantilever pattern 511 and a silicon oxide film 506 are sequentially formed, a supporting portion 507 made of glass is adhered to the cantilever pattern 511, and the silicon substrate 501 is removed. Through these steps, as shown in FIG. 4F, an SPM cantilever 512 comprised of the supporting portion 507 made of glass, a silicon cantilever portion 508 and a probe portion 509, is obtained.

According to the manufacturing method of this embodiment, the starting substrate 500 is constituted by the first silicon substrate 501 of a (100) plane and the second silicon substrate 503 of the (111) plane adhered thereto. For this reason, when the first silicon substrate 501 is etched, the etching is stopped without failure at the interface between the silicon substrates 503 and 501. This is because, when for example, an aqueous solution of KOH is used as the etching liquid, the etching rate on the (111) plane is about 1/400 that on the (100) plane.

Figure 6A:
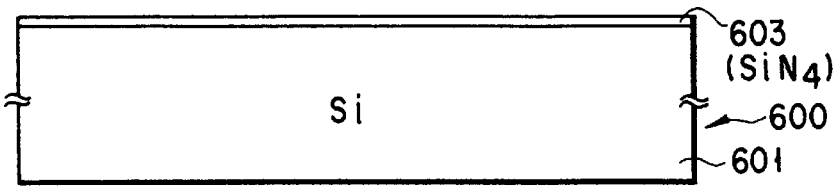
FIGS. 6A to 6F are diagrams for explaining an SPM cantilever according to a second embodiment of the present invention and a method for manufacturing the same.

An SPM cantilever according to a second embodiment of the present invention and a method for manufacturing the same will be described with reference to FIGS. 6A to 6F. The second embodiment is different in structure from the first embodiment only in that a silicon oxide film 613 may be interposed between the proximal end of the probe portion 609 and the cantilever portion 608. The silicon oxide film 613 is a remainder portion, which has not been removed in the process for forming the cantilever 612 of this embodiment, and does not influence the function of the cantilever 612. In FIGS. 6A to 6F, the members identified by reference numerals 600 to 612 are respectively the same as or similar to those identified by the numerals 200 to 212 in FIGS. 2A to 2F. In this embodiment, silicon nitride film is used as the material of a cantilever. First, as shown in FIG. 6A, a starting substrate 600 is constituted by a silicon substrate 601 of a (100) plane and a silicon nitride film 603, to be a cantilever portion, formed thereon. If necessary, for example, a silicon oxide film 613 (which is not shown in FIG. 6A but shown in FIG. 6B) is formed on the silicon nitride film 603. Since the silicon nitride film 603 is the material of the cantilever portion, the ratio of Si to N contained in the film of the countilever portion should be higher than 3:4 or higher. This is to reduce the difference in coefficient of thermal expansion between the silicon nitride film and Si, so that the cantilever may not bend after removing the silicon substrate 601 by etching. The silicon oxide film 613 is formed by oxidizing the starting substrate 600 in, for example, a thermal oxidizing furnace, or by depositing a silicon oxide film on the starting substrate 600 by the CVD method. The silicon oxide film 613 functions as an etching preventing layer for preventing the silicon nitride film 603, the material of the cantilever portion, from being etched, when the probe forming material is removed by etching (as shown in FIG. 6C). Therefore, the etching preventing layer is not limited to the silicon oxide film, but can be any other material in which the etching rate is much lower than that of the probe forming material.

Figure 6B:
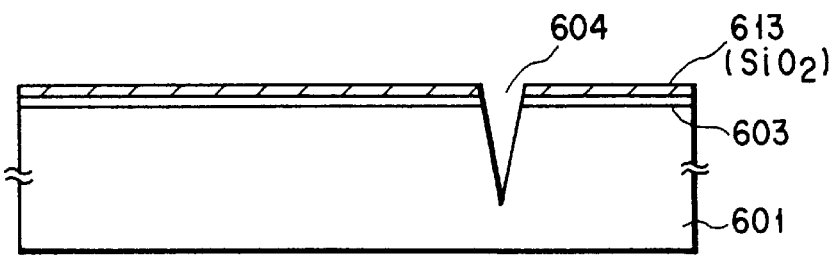
Figure 6C:
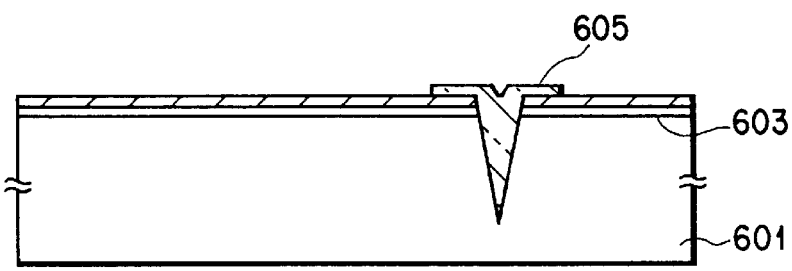
Figure 6D:
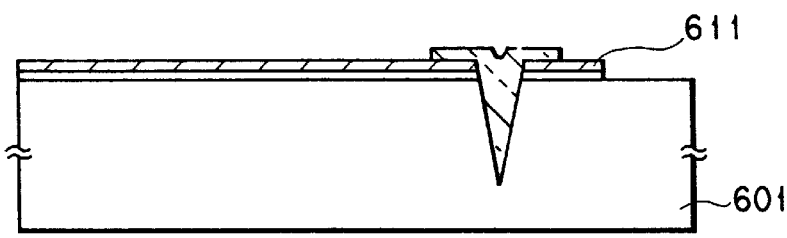
Figure 6E:
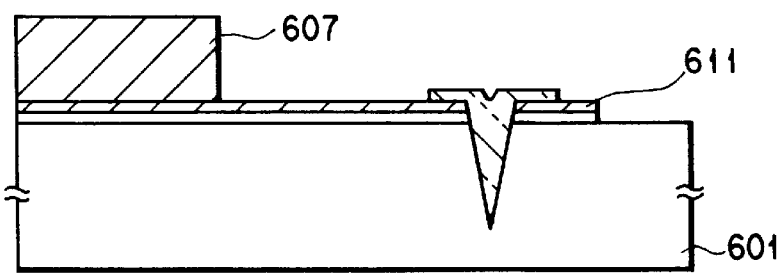
Figure 6F:
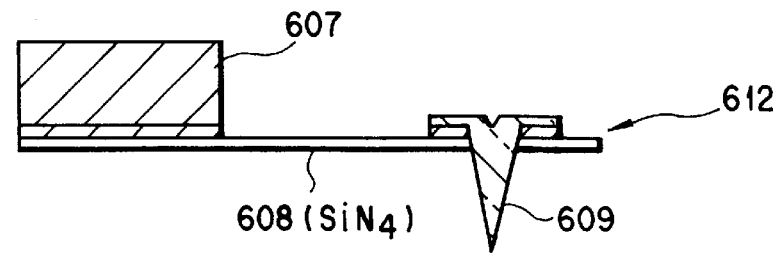

Then, as shown in FIG. 6B, a probe-forming replica hole 604 is formed in an upper portion of the starting substrate so as to reach the silicon substrate 601. In this embodiment, the replica hole can be formed by either the dry etching method or the wet etching method, as in the second and third method-embodiments. In the same manner as in the first method-embodiment, as shown in FIGS. 6C to 6F, a probe forming material 605 is deposited and then etched, a cantilever pattern 611 is formed, a supporting portion 607 made of glass is adhered to the cantilever pattern 611, and then, the silicon substrate 601 is removed. Through these steps, an SPM cantilever 612 comprised of the supporting portion 607 made of glass, a silicon cantilever portion 608 and a probe portion 609, is obtained.

According to this embodiment, since any special substrates are not used, the cantilever can be manufactured easily at a low cost. Further, although it is difficult to form a cantilever having a thick cantilever portion in the method of this embodiment, it is possible to form a very thin cantilever portion of about 200 nm. Since an AFM cantilever having such a thin cantilever portion has a soft lever characteristic, it enables AFM measurement in the contact method with a high contact sensitivity and a good resolution.

Figure 7A:
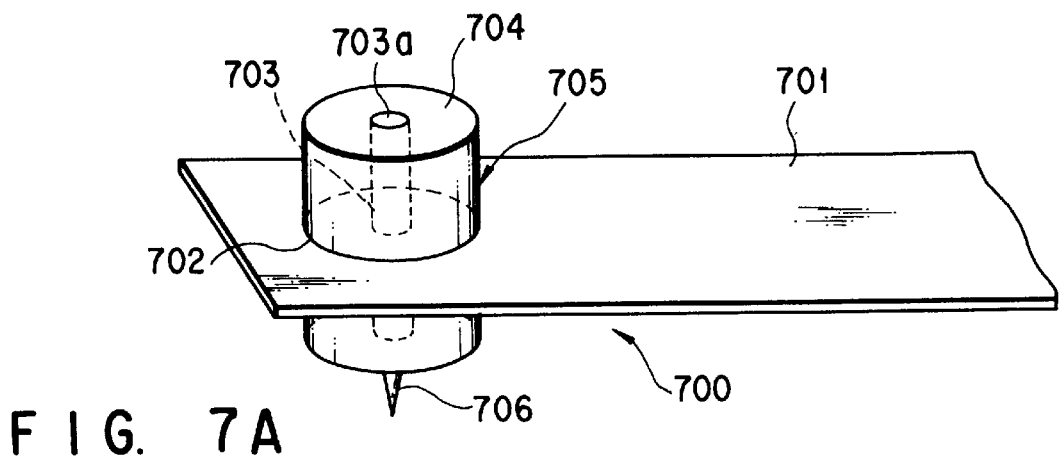
FIGS. 7A and 7B are perspective views respectively showing an SPM cantilever according to a third embodiment of the present invention and a modification thereof.

An SPM cantilever according to a third embodiment of the present invention will be described with reference to FIG. 7A, a perspective view showing only a main part of the cantilever. An SPM cantilever 700 of this embodiment is suitable for the SNOM measurement. It has a cantilever portion 701 formed of a plate of metal such as stainless steel. A hole 702, through which an optical fiber portion 705 is inserted, is formed in a distal end portion of the cantilever portion 701. The optical fiber portion 705 includes a core 703 for guiding light and a clad 704 having a refraction index smaller than that of the core 703. A conical probe portion 705 is formed integral with an end of the core 703 of the optical fiber portion 705 by etching with a mixture solution of hydrofluoric acid and ammonium fluoride. An end face 703a at the other end of the core 703 is cut flat.

In the SPM cantilever 700 thus formed, evanescent light or scattered light incident through the probe portion 706 is transmitted through the core 703, while it is repeating total reflection at the surface of the clad 704 having the smaller refraction index. Then, the light is applied through the end face 703a to an optical detector, such as a photodetector (not shown), arranged above the optical fiber portion 705 supporting the probe portion 706.

As described above, with the SPM cantilever of this embodiment, the evanescent light incident through the end of the probe portion or the scattered light scattered at the end of the probe portion can be applied to the optical detector arranged above the probe portion without loss. Therefore, if the cantilever is used in SNOM measurement, the sensitivity is improved. In addition, AFM measurement can also be performed by applying an optical probe of an optical displacement sensor to the cantilever portion 701. Thus, the SPM cantilever of this embodiment can perform both SNOM measurement and AFM measurement, individually or simultaneously.

Figure 7B:
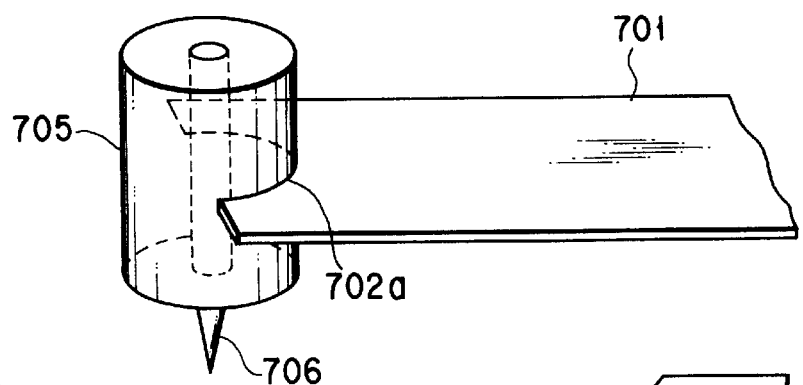

In this embodiment, the cantilever portion is made of a plate of metal, such as stainless steel. However, it can be made of any material, so long as it is a plate which can hold the optical fiber portion including the probe portion. Further, in this embodiment, the optical fiber portion 705 is held in the hole 702 formed at the end portion of the cantilever portion 701. However, as shown in FIG. 7B, it is possible that a U-shaped or semicircular cut portion 702a be formed at an end of the cantilever portion 701, so that the cut portion 702a can hold the optical fiber portion 705.

An SPM cantilever according to a fourth embodiment of the present invention will be described with reference to FIG. 8. An SPM cantilever 710 of this embodiment has a cantilever portion 712 extended from a supporting portion 711 and a probe portion 714 covered by a probe receiver 713 provided at an end of the cantilever portion 712. The end of the probe portion 714 projects from the probe receiver 713. The probe portion 714 has a hollow conical shape, having a substantially uniform thickness. The probe portion 714 is not limited to this shape but can be a hollow pyramidal shape. The refraction index $n_1$ of the probe portion 714 and the refraction index $n_2$ of the probe receiver 713 have the relationship $n_1 > n_2$. The probe portion 714 and the probe receiver 713 may be formed of silicon-basic material used in the conventional chip producing process utilizing the semiconductor process. For example, the probe portion 714 can be formed of silicon nitride ($SiN_4$) film and the probe receiver 713 can be formed of silicon oxide ($SiO_2$) film. Both the silicon nitride and silicon oxide are optically transparent and the refraction indexes thereof have the relationship $n_1 > n_2$. The probe portion 714 covered by the probe receiver 713 is held by a cut portion formed at the distal end of the cantilever portion 712 as in the modification of the third cantilever-embodiment shown in FIG. 7B.

In materials of different refraction indexes, light is transmitted from a material having a lower refraction index to a material having a higher refraction index. Since the refraction index of the probe receiver 713 is set lower than that of the probe portion 714, the light incident on the exposed end of the probe 714 at an angle or smaller repeats total reflection at the interface between the probe portion 714 and the probe receiver 713. The light is not output through the end of the probe portion 714 or, even if it is output therethrough, the amount of the output light is suppressed to the minimum and most of the light is transmitted to the upper portion of the probe portion 714.

As described above, with the SPM cantilever of this embodiment, the evanescent light incident through the distal end of the probe portion 714 or the scattered light scattered at the end of the probe portion 714 can be applied to an optical detector arranged above the probe portion, without being transmitted to the probe receiver 713 or the cantilever portion 712. Since loss of the evanescent light or the scattered light is prevented, if the cantilever is used in SNOM measurement, the sensitivity is improved. In addition, like the third cantilever-embodiment, AFM measurement can be performed by applying an optical probe of an optical displacement sensor to the cantilever portion 701. Thus, the SPM cantilever of this embodiment can perform both SNOM measurement and AFM measurement, individually or simultaneously.

In this embodiment, the material of the cantilever portion 712 may be silicon nitride film or silicon oxide film, used as SPM cantilevers in general. However, it is not limited to these materials.

An SPM cantilever according to a fifth embodiment of the present invention will be described with reference to FIG. 9. An SPM cantilever 720 of this embodiment has a cantilever portion 722 extended from a supporting portion 721 and a probe portion 724 covered by a metal probe receiver 723 provided at an end of the cantilever portion 722. The surface of the probe receiver 723, which is in contact with the probe portion 724, functions as a mirror for reflecting incident light. The reflecting surface need not be particularly processed to perform the function, but can be mirror-processed. The probe portion 724 has the same structure as in the fourth embodiment shown in FIG. 8. The material of the cantilever portion 722 is not particularly limited also.

In the SPM cantilever 720 having the above structure, the light incident on the end of the probe 724 repeats total reflection at the reflection surface of the probe receiver 723. The light is not output through the end of the probe portion 724 or, even if it is output therethrough, the amount of the output light is suppressed to the minimum and most of the light is transmitted to the upper portion of the probe portion 724. Therefore, like the third cantilever-embodiment, the evanescent light incident through the end of the probe portion 724 or the scattered light scattered at the end of the probe portion 724 can be applied to an optical detector arranged above the probe portion, without being transmitted to the probe receiver 723 or the cantilever portion 722. Since loss of the evanescent light or the scattered light is prevented, if the cantilever is used in SNOM measurement, the sensitivity is improved. In addition, like the third cantilever-embodiment, AFM measurement can be performed by applying an optical probe of an optical displacement sensor to the cantilever portion 701. Thus, the SPM cantilever of this embodiment can perform both SNOM measurement and AFM measurement, individually or simultaneously.

Figure 8:
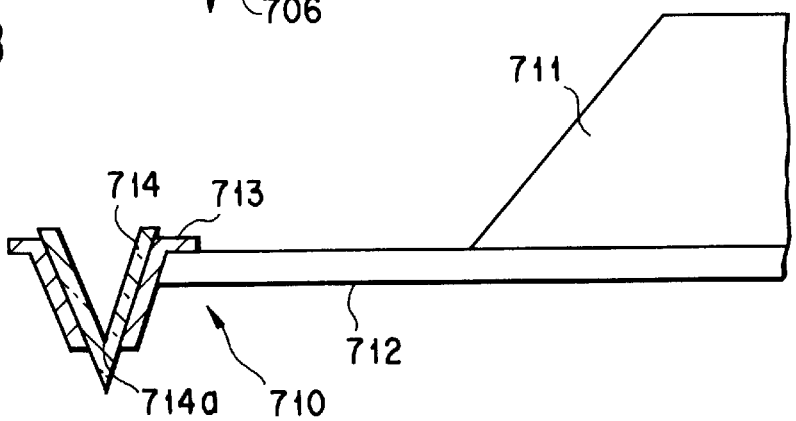
FIG. 8 is a cross-sectional view showing an SPM cantilever according to a fourth embodiment of the present invention.

In this embodiment, the probe receiver 723 covers the probe portion 724 to an extent nearer to the end as compared to the embodiment shown in FIG. 8. Therefore, light from a portion other than the surface of a sample is prevented from being incident on the probe, thereby enabling SNOM measurement with a higher resolution. However, it is possible that the probe receiver 723 covers the probe portion 724 to the same extent as in the embodiment shown in FIG. 8.

An SPM cantilever according to a sixth embodiment of the present invention will be described with reference to a cross sectional view shown in FIG. 10. An SPM cantilever 730 of this embodiment has a cantilever portion 732 extended from a supporting portion 731 and a probe portion 734 covered by a probe receiver 733 provided at an end of the cantilever portion 732. The probe portion 734 is made of a bulk homogeneous isotropic medium and the probe receiver 733 is made of a material having a lower refraction index than that of the probe portion 734. Therefore, the light incident on the end of the probe 734 at an angle repeats reflection at the interface between the probe portion 734 and the probe receiver 733. The light is not output through the probe portion 734 or, even if it is output therethrough, the amount of the output light is suppressed to the minimum and most of the light is transmitted to the upper portion of the probe portion 734. In this embodiment, the material of the cantilever portion 732 is not particularly limited. The probe portion 734 is made of a bulk homogeneous isotropic medium for the following reason. In the hollow conical or pyramidal probe portion 714 or 724, having a uniform thickness, the scattered light, incident on the probe portion 714 or 724 in the fourth and fifth cantilever embodiments shown in FIGS. 8 and 9 is scattered again by an inner end portion 714a or 724a of the probe portion 714 or 724. As a result, the amount of light transmitted upward in the probe portion 714 or 724 is decreased. However, according to this embodiment, since the probe portion is made of a bulk homogeneous isotropic medium, such a phenomenon is prevented.

In the SPM cantilever of this embodiment, like the third cantilever-embodiment, the evanescent light incident through the end of the probe portion or the scattered light scattered at the end of the probe portion can be applied to an optical detector arranged above the probe portion, without being transmitted to the probe receiver or the cantilever portion. Since loss of the evanescent light or the scattered light is thus prevented, if the cantilever is used in SNOM measurement, the sensitivity is improved. In addition, both SNOM measurement and AFM measurement can be performed, individually or simultaneously, by providing the probe portion of the SPM cantilever with a SNOM measuring function.

An SPM cantilever according to a seventh embodiment of the present invention will be described. In this embodiment, the probe receiver 733 for covering the probe portion 734, of the sixth embodiment shown in FIG. 10 is made of metal instead of a bulk homogeneous isotropic medium as in the ninth embodiment. The probe receiver of the tenth embodiment also produces the same effect as in the eighth embodiment.

In the SPM cantilever 730 of this embodiment, the evanescent light incident through the end of the probe portion 734 repeats reflection at the interface between the probe portion 734 and the probe receiver 733. The light is not output through the probe portion 734 or, even if it is output therethrough, the amount of the output light is suppressed to the minimum and most of the light is transmitted to the upper portion of the probe portion 734. Therefore, like the third cantilever-embodiment, the evanescent light incident through the end of the probe portion or the scattered light scattered at the end of the probe portion can be applied to an optical detector arranged above the probe portion, without being transmitted to the probe receiver or the cantilever portion. Since loss of the evanescent light or the scattered light is thus prevented, if the cantilever is used in SNOM measurement, the sensitivity is improved. In addition, both SNOM measurement and AFM measurement can be performed, individually or simultaneously, by providing the probe portion of the SPM cantilever with an SNOM measuring function.

In this embodiment also, it is possible that the probe receiver 733 cover the probe portion 734 to an extent nearer to the end, as in the fifth cantilever-embodiment. With this structure, light from a portion other than the surface of a sample is prevented from being incident on the probe, thereby enabling SNOM measurement with a higher resolution.

Figure 9:
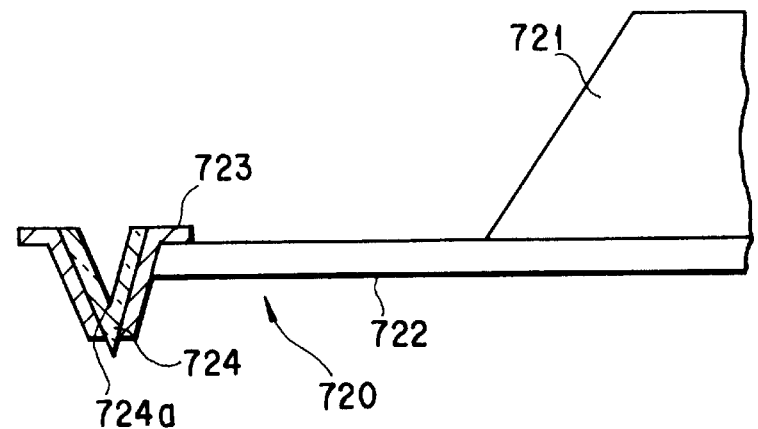
FIG. 9 is a cross-sectional view showing an SPM cantilever according to a fifth embodiment of the present invention.
Figure 10:
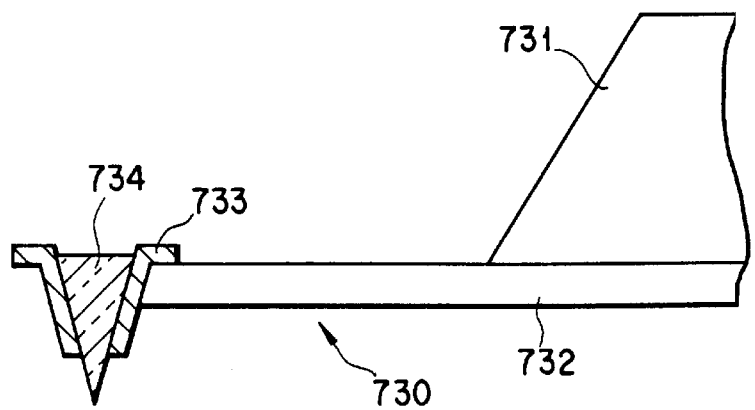
FIG. 10 is a cross-sectional view showing an SPM cantilever according to a sixth (seventh) embodiment of the present invention.

In the fourth to seventh cantilever-embodiments shown in FIGS. 8 to 10, the probe portion is held by the cut portion formed at the distal end of the cantilever portion. However, the holding of this probe portion is not limited to this arrangement but can be of the arrangement of the third cantilever-embodiment shown in FIG. 7A, in which the probe portion is inserted in the hole in the end portion of the cantilever portion.

Figure 11A:
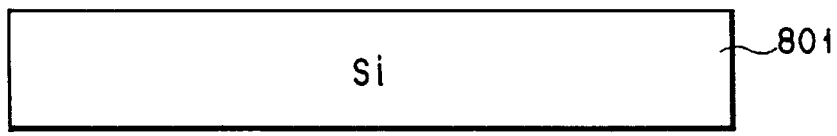
FIGS. 11A to 11H are diagrams for explaining an SPM cantilever according to an eighth embodiment of the present invention and a method for manufacturing the same.
Figure 11B:
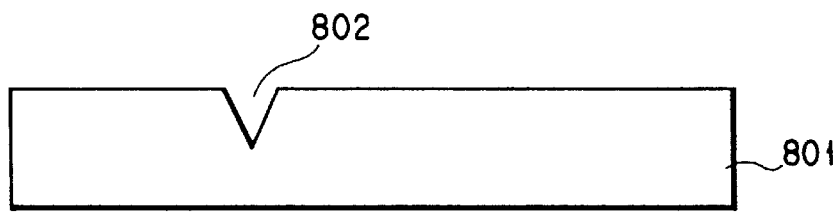
Figure 11C:
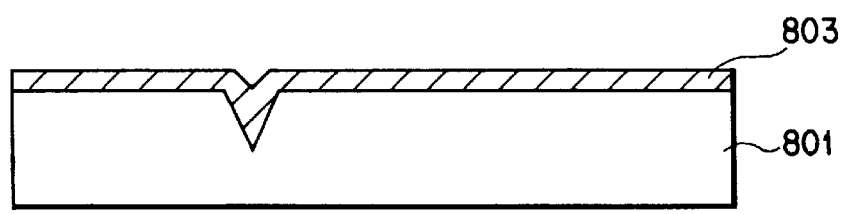
Figure 11D:
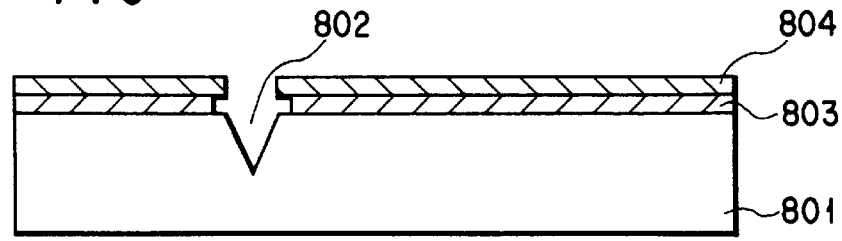
Figure 11E:
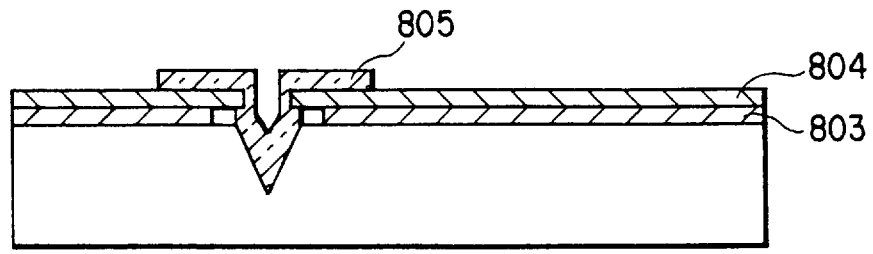

An SPM cantilever of an eighth embodiment and a method for manufacturing the same, according the present invention, will be described with reference to FIGS. 11A to 11H showing the manufacturing steps. First, as shown in FIG. 11A, a silicon wafer 801 is prepared. As shown in FIG. 11B, a probe-forming replica hole or concave 802 is formed at an end portion of one surface of the silicon wafer 801 by photolithography and wet or dry etching. Then, as shown in FIG. 11C, a silicon nitride film 803 of a thickness of 0.4 to 1 μm is deposited by the CVD method on the surface of the silicon wafer including the replica hole. Thereafter, a silicon oxide film 804 is deposited on the silicon nitride film 803 by the CVD method or the like. As shown in FIG. 11D, the silicon oxide film 804 and the silicon nitride film 803 at the portion above the replica hole 802 are selectively removed by photolithography and wet or dry etching. The silicon nitride film 803 is etched, by the function of over-etching, to a portion around the periphery of the replica hole 802 in the silicon wafer 801. For this reason, a replica hole, smaller than the replica hole 802 in the silicon oxide film 804, is formed in the silicon nitride film 803. Subsequently, as shown in FIG. 11E, a silicon nitride film is deposited on the substrate again and patterned into the shape of a probe portion 805.

Figure 11F:
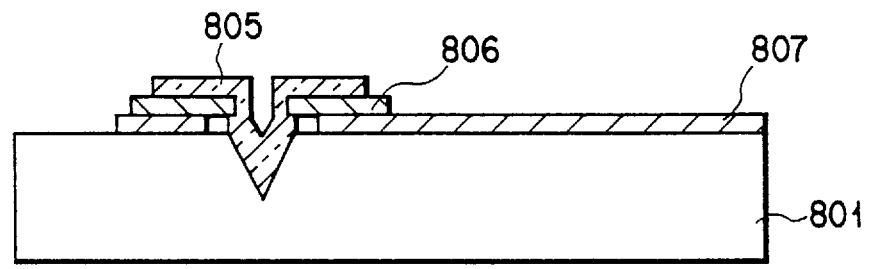
Figure 11G:
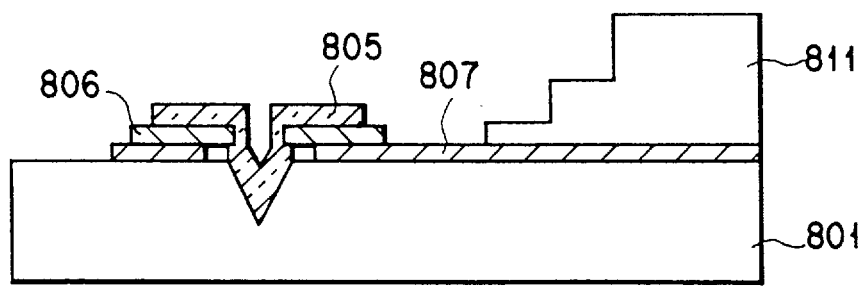
Figure 11H:
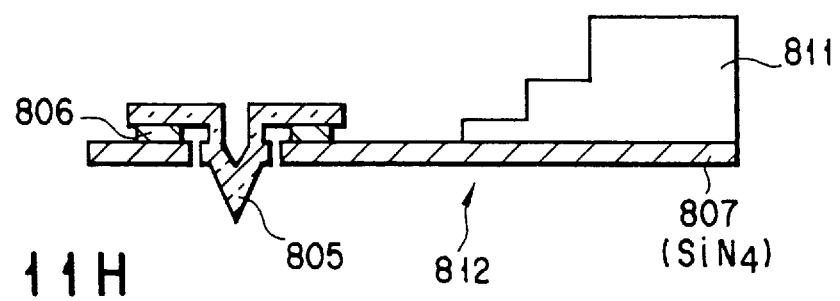
Figure 12A:
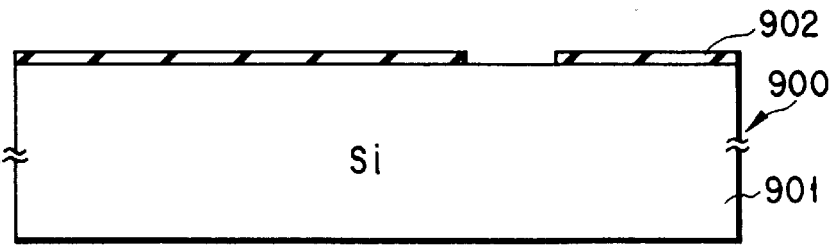
FIGS. 12A to 12F are diagrams for explaining a method for manufacturing a conventional SPM cantilever.
Figure 12B:
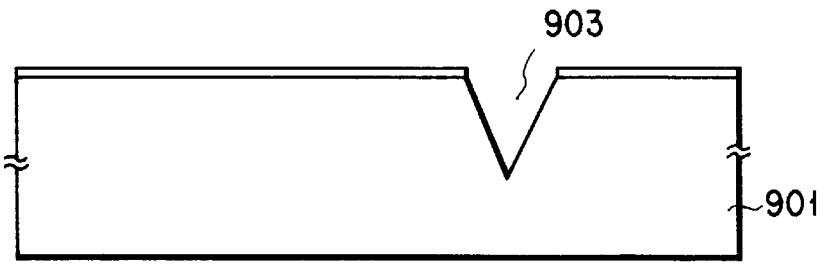
Figure 12C:
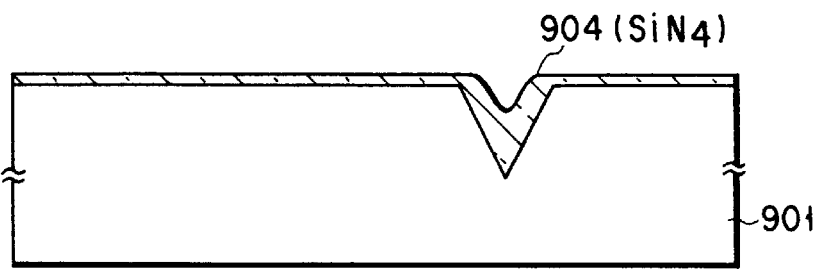
Figure 12D:
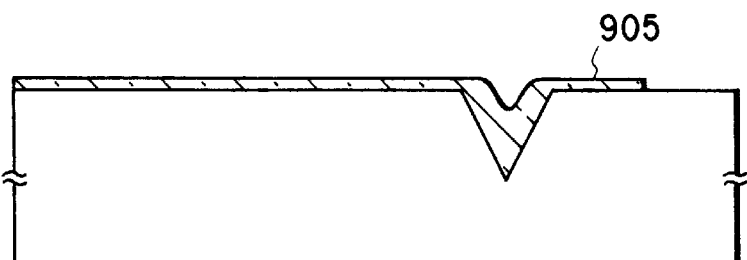
Figure 12E:
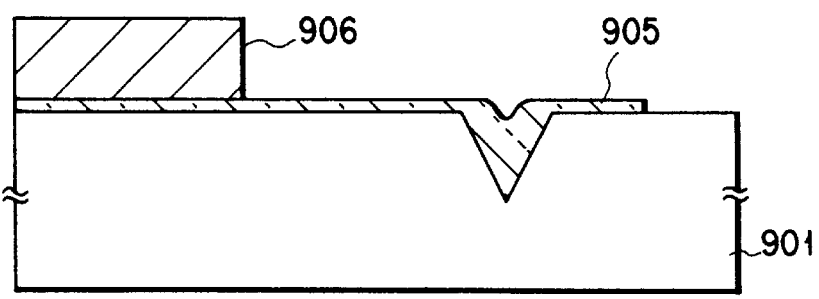
Figure 12F:
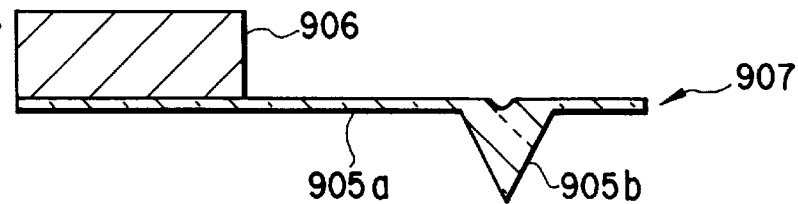

Then, as shown in FIG. 11F, the silicon oxide film 804 is patterned into the shape of a probe receiver 806 and the silicon nitride film 803 is patterned into the shape of a cantilever portion 807. Then, as shown in FIG. 11G, a supporting portion 811 made of Pylex is anode-bonded to an end portion of the cantilever portion 807 on the silicon wafer 801. Finally, as shown in FIG. 11H, the silicon wafer 801 is removed by etching with a 40% KOH solution, thereby forming an SPM cantilever 812.

The SPM cantilever 812 thus manufactured comprises a cantilever portion 807, made of the silicon nitride film, extended from a glass supporting portion 811 and a probe portion 805 held at an end of the cantilever portion 807 via a probe receiver 806 made of the silicon oxide film. Although the probe portion 805 and the cantilever portion 807 are integral with each other via the probe receiver 806, they are not in direct contact with each other.

In the above SPM cantilever, the probe portion 805, made of silicon nitride film, has a refraction index of 2.1 to 2.2, whereas the probe receiver 806, made of silicon oxide film, has a refraction index of 1.4 to 1.5. Since the probe receiver 806 has a lower refraction index than the probe portion 805, the light incident on the end of the probe portion 805 is not transmitted to the probe receiver 806 and the cantilever portion 807. Thus, the light incident on the probe portion 805 is prevented from being transmitted to the cantilever portion 807 by the probe receiver 806 made of silicon oxide film. The light therefore can be applied to an optical detector arranged above the probe portion 805 with little loss. Since loss of the evanescent light or the scattered light is thus prevented, if the cantilever is used in SNOM measurement, the sensitivity is improved. Moreover, with the above manufacturing process, an SPM cantilever can be manufactured easily and stably.

As has been described above based on the embodiments, according to the SPM cantilever of the present invention, since the cantilever and the probe portion are made of different materials, both the requirements for the cantilever and the probe portion can be satisfied. In addition, since the cantilever supporting portion is bonded to the surface of the cantilever, the SPM cantilever can be manufactured easily with the bonding process from the surface. Further, the SPM cantilever is applicable to a very wide range; for example, in a case where an optical transmitting material is used as the probe portion, the SPM cantilever can be applied to SNOM measurement; in a case of a conductive material, STM measurement; in a case of a transparent conductive material, SNOM and STM measurement; and in a case of a rigid material, mechanical process. Furthermore, an optical shading portion may be interposed between the probe portion made of optical transmitting material and the cantilever portion, so that incident light or scattered light from the probe portion can be transmitted to the upper portion of the probe portion without loss. If the cantilever is used in SNOM measurement, the S/N ratio can be improved and the sensitivity and the resolution can be high. Further, it is possible to perform SNOM measurement and AFM measurement simultaneously. According to the method of the present invention, the above cantilever can be manufactured easily with only the process from the substrate surface without a special manufacturing apparatus.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An SPM cantilever comprising:
   a probe portion; and
   a cantilever portion having a proximal end portion, a free end portion, a first surface and a second surface,
   the probe portion extending from the first surface of the free end portion,
   the cantilever portion being bent according to an interaction between a sample and the probe portion,
   the probe portion and the cantilever portion being made of materials having different properties,
   the material of the probe portion being a hard material relative to the material of the cantilever portion, and
   wherein said probe portion is made of silicon nitride, and said cantilever portion is made of silicon.

2. The SPM cantilever according to claim 1, wherein the free end portion of said cantilever includes a hole which extends to the first surface from the second surface, and said probe penetrates the hole.

3. An SPM cantilever comprising:
   a probe Portion; and
   a cantilever Portion having a Proximal end portion, a free end portion, a first surface and a second surface,
   the probe portion extending from the first surface of the free end portion,
   the cantilever portion being bent according to an interaction between a sample and the probe portion,
   the probe portion and the cantilever portion being made of materials having different properties,
   the material of the Probe Portion being a hard material relative to the material of the cantilever portion,
   wherein said Probe portion is made of silicon nitride, and said cantilever portion is made of silicon, and
   wherein the silicon nitride of which said probe portion is made includes silicon and nitrogen in a ratio of 3:4.

4. The SPM cantilever according to claim 3, wherein the free end portion of said cantilever includes a hole which extends to the first surface from the second surface, and said probe penetrates the hole.

5. An SPM cantilever comprising:
   a probe portion; and
   a cantilever portion having a proximal end portion, a free end portion, a first surface and a second surface,
   the probe portion extending from the first surface of the free end portion,
   the cantilever portion being bent according to an interaction between a sample and the probe portion,
   the probe portion and the cantilever portion being made of materials having different properties,
   the material of the probe portion being a hard material relative to the material of the cantilever portion, and
   wherein said probe portion is made of silicon carbide, and said cantilever portion is made of silicon.

6. The SPM cantilever according to claim 5, wherein the free end portion of said cantilever includes a hole which extends to the first surface from the second surface, and said probe penetrates the hole.

7. An SPM cantilever comprising:
   a probe portion; and
   a cantilever portion having a proximal end portion, a free end portion, a first surface and a second surface,
   the probe portion extending from the first surface of the free end portion,
   the cantilever portion being bent according to an interaction between a sample and the probe portion,
   the probe portion and the cantilever Portion being made of materials having different properties,
   the material of the probe portion being a hard material relative to the material of the cantilever portion, and
   wherein said probe portion is made of silicon nitride including silicon and nitrogen in a ratio of 3:4, and said cantilever portion is made of silicon nitride including a larger amount of silicon relative to the probe portion.

8. An SPM cantilever comprising:
   a probe portion; and
   a cantilever portion having a proximal end portion, a free end portion, a first surface and a second surface,
   the probe portion extending from the first surface of the free end portion, the cantilever portion being bent according to an interaction between a sample and the probe portion, the probe portion and the cantilever portion being made of materials having different properties, the material of the probe portion being a hard material relative to the material of the cantilever portion, and further comprising an optical shading portion attached to a circumferential surface of the probe portion and made of material having a lower refraction index than the probe portion, and wherein said probe portion is supported on the cantilever portion by the optical shading portion.

9. The SPM cantilever according to claim 8, wherein:

said optical shading portion and said probe portion have optically transparent properties; and said probe portion has a hollow conical shape and an opening at a proximal end portion thereof.

10. The SPM cantilever according to claim 8, wherein:

said probe portion has a hollow conical shape and an opening at a proximal end portion thereof; and said optical shading portion is formed of a metal film having a surface in contact with the probe portion and which acts as a mirror surface.

11. The SPM cantilever according to claim 8, wherein:

said probe portion includes a conical member made of a bulk homogeneous isotropic medium; and said optical shading portion is formed of a metal film having a surface in contact with the probe portion and which acts as a mirror surface.

12. The SPM cantilever according to claim 8, wherein said optical shading portion is made of a metal film having a surface in contact with the probe portion and which acts as a mirror surface.

* * * * *